United States Patent
Campfield et al.

[19]

[11] Patent Number: 5,860,689
[45] Date of Patent: *Jan. 19, 1999

[54] METHOD FOR PROTECTING A WINDSHIELD FROM CRACKS

[75] Inventors: Richard A. Campfield, Grand Junction; Timothy Evans, Colorado Springs, both of Colo.

[73] Assignee: Edgeguard, Inc., Grand Junction, Colo.

[ * ] Notice: The term of this patent shall not extend beyond the expiration date of Pat. No. 5,653,497.

[21] Appl. No.: 834,717

[22] Filed: Apr. 1, 1997

Related U.S. Application Data

[63] Continuation of Ser. No. 646,036, May 7, 1996, Pat. No. 5,653,497.

[51] Int. Cl.$^6$ ...................................................... B60C 11/06
[52] U.S. Cl. ......................... 296/95.1; 296/136; 296/97.7
[58] Field of Search .................................. 296/95.1, 97.7, 296/97.2, 136

[56] References Cited

U.S. PATENT DOCUMENTS

| | | |
|---|---|---|
| 4,597,931 | 7/1986 | Watanabe et al. . |
| 4,811,982 | 3/1989 | Carlyle ................................ 296/97.7 X |
| 4,824,926 | 4/1989 | O'Dwyer et al. . |
| 4,923,757 | 5/1990 | O'Dwyer et al. . |
| 4,938,522 | 7/1990 | Herron et al. ........................... 296/136 |
| 5,002,326 | 3/1991 | Westfield et al. ....................... 296/95.1 |
| 5,211,438 | 5/1993 | Snow ...................................... 296/95.1 |
| 5,332,278 | 7/1994 | Berry et al. . |
| 5,356,193 | 10/1994 | Palmer, II et al. ...................... 296/136 |

*Primary Examiner*—Joseph D. Pape
*Attorney, Agent, or Firm*—Lawrence S. Cohen

[57] ABSTRACT

A means and method for protecting a windshield from damage and therefore the development of cracks due to stone or other impact on windshields around the peripheral area. An impact resistant barrier is placed around the periphery of the windshield. The barrier is preferably a clear polymeric film, but could be opaque rubber plastic or metal. The barrier is placed on the glass surface and in contact adjacent to the windshield molding. The width of the barrier is selected to eliminate the higher incidence of damage to the peripheral area.

27 Claims, 1 Drawing Sheet

METHOD FOR PROTECTING A WINDSHIELD FROM CRACKS

RELATED APPLICATIONS

This application is a continuation of application Ser. No. 08/646,036, filed on May 7, 1996, now U.S. Pat. No. 5,653,497, the content of which is incorporated by reference herein.

FIELD OF THE INVENTION

The invention relates to means and methods for preventing and protecting automobile windshields from damage caused by impacts from flying objects. In particular the invention relates to a barrier placed around the periphery of the windshield to absorb the impact from objects and thereby prevent damage.

BACKGROUND

Damage to windshields caused by debris or other impacts has long been a problem. Many patents have issued and a substantial business thrives respecting the repair of such damage. For a long time it was believed that long cracks, that is cracks over six inches in length could not be repaired. However, shorter cracks referred to as stone damage were repairable. Later through significant developments in the field it became possible to repair long cracks. Patents which relate to the repair of long cracks in windshields are U.S. Pat. No. 5,116,441, U.S. Pat. No. 5,425,827, U.S. Pat. No. 5,429,692, U.S. patent application Ser. No. 08/436,155, U.S. patent application Ser. No. 08/436,591 and U.S. patent application Ser. No. 08/459,039.

Also, there is a thriving business in the replacement of cracked windshields which either cannot be repaired or which are believed to be unrepairable. In fact replacement is vastly more common than repair.

Despite these thriving businesses damage to windshields present costs to the consumer because of the cost of the repair or replacement. When insurance covers the damage then there is an insurance company loss which is passed on to consumers through their premiums. Also tons of unrecycled waste are created year after year.

Impacts which cause damage near the glass edge nearly always result in an edge crack, that is a crack running through the impact point to the edge of the glass. These cracks are also nearly always long cracks, that is over 6 inches in length. By contrast impacts in the middle area of the windshield quite often result only in the limited damage known as chips or stone damage, that is a bullseye, a star break or a combination and absent any long crack. Thus the problem of windshield damage in the peripheral area is considerably greater than in the middle. Long cracks, especially edge cracks, demand attention soon after cracking and most end up being replaced.

Windshields are installed with a rubber or plastic and in some cases metal, molding. Presently, most moldings are 1–2 centimeters wide, about 50% of the molding width extending over the glass. The maximum known molding width covers 2 cm of the windshield glass.

SUMMARY OF THE INVENTION

The present invention provides a means and method for protecting a windshield from damage and therefore the development of cracks due to stone or other impact on windshields around the peripheral area. According to the invention, an impact resistant barrier is placed around the periphery of the windshield. The barrier is preferably a clear polymeric film, but could be opaque rubber, plastic or metal. The barrier is placed on the glass surface and in contact adjacent to the windshield molding. The width of the barrier is selected to eliminate the higher incidence of damage in the peripheral area; but the width may differ between sides, top and bottom, and it may differ in various vehicles. In one form of the invention, a clear plastic film is adhered to the windshield around its periphery to a selected width from the windshield molding. The clear plastic film will absorb impact from flying debris and allow visibility. As an alternative, equivalent protection can be obtained by a wider molding. Also, the film need not be clear in all portions of the windshield. The barrier can be installed before the windshield is fitted to the vehicle in which case it could extend to the edge of the glass.

In an alternate preferred embodiment a clear polymeric film is from 6–10 mils thick and a preferred thickness is 6–8 mils, most preferably 7 or 8 mils. The range of 6–8 mils and the 7 mils thickness being especially preferred or bowed windshield portions as thicker films are too stiff.

In another alternate preferred embodiment, the clear film is a polyester. A further preferred embodiment is a clear laminated multi-layer, preferably 2 layer polyester film 6–10 mils thick, more preferably 6–8 mils thick and most preferably 7 or 8 mils. The range of 6–8 mils and the 7 or 8 mils thickness being especially preferred on bowed windshield portions.

DETAILED DESCRIPTION

The invention is a method and means for protecting windshields from impacts which would cause damage, most importantly cracks of the kind which generally require replacement of the windshield, although in some cases repair is possible. In this invention, when applied to a windshield already installed, the impact absorbing barrier is adhered to the peripheral areas of the windshield, the sides, top and bottom, adjacent to the molding and extending a selected width into the glass area. When applied before the windshield is installed, the barrier can extend to the edge of the windshield so that a portion of it is captured under the windshield molding. The barrier may be clear or opaque, and may be of a variety of materials such as plastic film, rubber or metal.

Also the barrier may be constructed by extending the windshield retaining molding over the glass selected distance.

Plastic film is supplied and used in many thicknesses, configurations and plastic formulations. Selection of a film thickness and plastic formulation for use in this invention is such as to provide good impact absorption sufficient to prevent damage from impact which would allow a crack to form. In practice the selected material will prevent any damage, even a chip because as will be seen a chip in the vulnerable peripheral area commonly leads to an edge crack. In order to minimize distortion of visibility the film should be as thin as possible consistent with achieving the impact absorption goal. This is more important at the sides than at the top and bottom.

Figure 1:
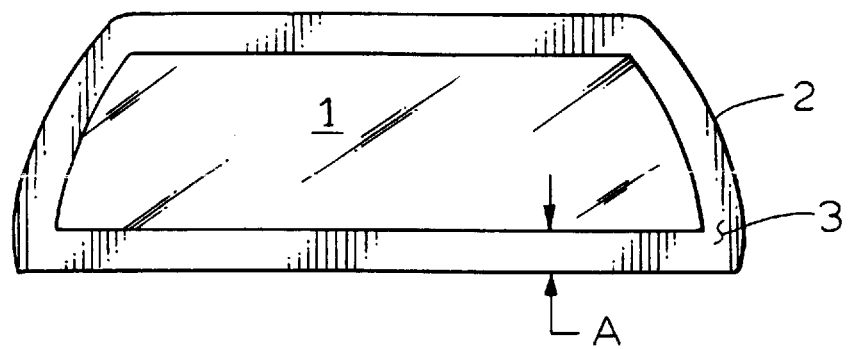
FIG. 1 shows a front view of a windshield having the inventive film applied in an exemplary OEM application.

Referring to FIG. 1, in the present invention, an automobile windshield 1 having a molding 2 around its periphery is the subject of the invention. A clear plastic film 3 is placed around the periphery inside the molding. The film 3 should have the selected dimension A. It should be adhered permanently to the windshield by an adhesive layer. Alternatively the film can be adhered in a manner which allows periodic replacement, for example if the film becomes damaged or worn or loses its clarity.

Therefore, the film 3 will absorb impact and protect the windshield from rocks and other debris.

Over 90% of windshield long cracks are caused by impacts in the peripheral distance within 4 inches (approximately 10 cm) of the exposed periphery of the windshield, that is, within a margin measured from the molding to about 4 inches into the glass area. Most of these long cracks are caused by stones, although other flying debris can also cause such cracks.

The plastic film should be selected from a material that is clear and crack resistant and will not fog or discolor over time due to sunlight or severe weather conditions.

An exemplary film is 3M Scotchcal™. This is an 8 mils urethane plastic film sold by 3M. It has adhesive on one side which will be activated by a solution of 25% isopropyl alcohol and 75% water, then this film can be applied to a surface for protection. The film could be thicker, for example up to about 30 mils. A film should be as thick as necessary to absorb impact but not so thick as to interfere with any function of the windshield or the wipers.

A preferred method of providing the peripheral protection for OEM applications is to prepare a one piece four sided clear plastic frame of the selected dimensions. It would be shaped to fit along the inside of the molding although it could extend under the molding to the glass edge. Most windshields are curved at the sides, some are curved at the top or bottom. Therefore, the four sided plastic frame is configured to match the periphery of the windshield against the molding and extending inward into the viewing area the selected distance. The frame therefore should match the curves to give a uniform distance from the molding. This is seen in FIG. 1. However uniformity is not essential as noted below. If the film frame extends under the molding, then curved matching against the molding is irrelevant.

Figure 2:
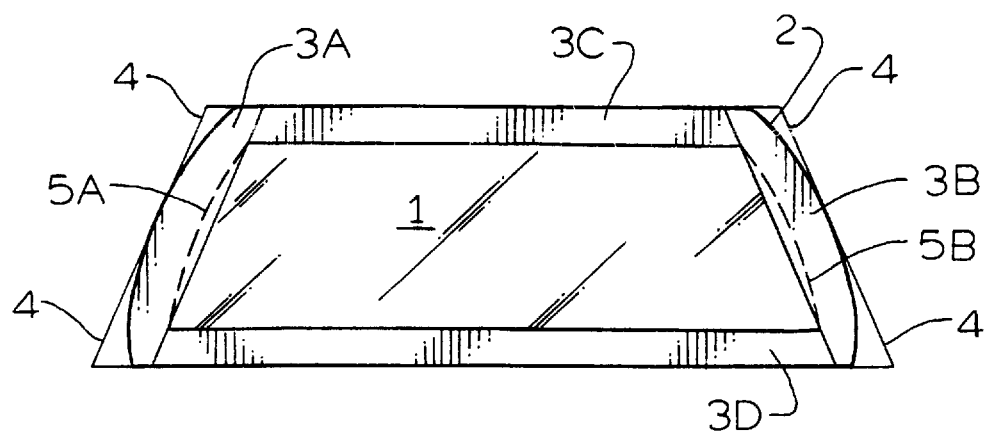
FIG. 2 shows a front view of a windshield having the inventive film applied in an exemplary aftermarket application.

A preferred method of providing the peripheral protection for aftermarket applications uses a roll of film from which desired lengths are cut off. Then the pieces are laid onto the windshield, marked and cut to the desired configuration. FIG. 2 shows this means and method. The windshield 1 has a molding 2 surrounding it. The plastic frame is formed of four separate pieces, 3A, 3B, 3C and 3D on the left side, right side, top and bottom respectively. Since the individual frame pieces are cut from a roll or a strip of selected width the corners 4 are to be trimmed off, the ends cut to fit and the inside edges such as pieces 3A and 3B are preferably trimmed to a curvature to match the molding curvature as seen at 5A and 5B. Templates of paper or cardboard may be made first. Then the film element or elements are prepared with an adhesive and placed on the windshield. The film could also be supplied in wide sheets from which strips are cut having the requisite width and shape.

Alternatively the plastic film may be opaque, or the material may be rubber or metal.

A 4 inch width of the impact absorbent barrier has been shown to be effective for over 90% of cracks, other dimensions are defined by the examples below.

An alternative form of the invention refers to the molding used to help set and hold the windshield in place. Widening the molding to a selected distance over the glass would accomplish the objectives of this invention. This could be done when the vehicle is manufactured or when the windshield is replaced.

EXAMPLE NO. 1

In this example a total of 235 windshields with long cracks were observed in shopping malls in the Colorado Springs, Colo. area in February 1996. These windshields all had long cracks i.e. over 6" long. Of these, 225 windshields had cracks from impacts up to 5 inches from the molding and all were edge cracks. The remaining 10 windshields had cracks where the impact point was more than 5 inches from the molding. These 10 were scattered all over the windshield middle area. Of these 10, some were edge cracks and some were not. The survey did not look at stone damage absent a long crack. It is frequent that an impact in the middle area does not result in a long crack, and very rare that it would result in an edge crack. For purposes of this survey it was considered that 5" would be the maximum guardable distance from the molding using the invention, due to practical limitations. The following data was observed:

| Crack Location | Percent At 5" or Less of Total | Percent Of Total |
| --- | --- | --- |
| 141 impact points of the cracks were at or within 1" (2.5 cm) of molding | 63% | 60% |
| 186 impact points of the cracks were at or within 2" (5.1 cm) of molding | 83% | 79% |
| 202 impact points of the cracks were at or within 3" (7.6 cm) of molding | 90% | 86% |
| 215 impact points of the cracks were at or within 4" (10.2 cm) of molding | 96% | 91% |
| 225 impact points of the cracks were at or within 5" (12.7 cm) of molding | 100% | 96% |
| 10 additional impact points of the cracks were more than 5" from the molding | | 100% |
| 235 | | |

NOTE: The above centimeter conversions are not intended to convey an accuracy level as the measurements were made in inches. Distances are considered to have a very large tolerance as great precision is not relevant. For example the 12.7 cm measurement as considered to be about 12 cm.

It is considered that these windshields would most likely be replaced, although the option of repair may be elected by some customers. Therefore if a film width of 5 inches or about 12 cm were employed only 10 of 235 windshields would not have been saved.

EXAMPLE II

In this example, 236 windshields with long cracks were observed at a shopping mall in Colorado Springs, Colo. in March 1996. Of the total, 203 damaged windshields with long cracks which were edge cracks from impacts within 6 cm of the edge.

Of the thirty three cracks from impacts beyond 6 cm from the molding, about half went to the edge. Of the thirty three, only three were from impacts in the distance between 6 cm and 12 cm from the molding. Also 415 chips were found which were more than 6 cm from the edge, without any crack. Also there were 23 chips within 6 cm which had not yet cracked, although it is presumed they would crack shortly they are not counted as cracks in this survey.

This data can be summarized as follows:

TABLE 2

|  | Percent of Total at 6 cm or less | Percent of Overall Total |
|---|---|---|
| 74 of the impact points were at or within 1 cm of molding | 36% | 31% |
| 137 of the impact points were at or within 2 cm of molding | 67% | 58% |
| 163 of the impact points were at or within 3 cm of molding | 80% | 69% |
| 184 of the impact points were at or within 4 cm of molding | 91% | 78% |
| 191 of the impact points were at or within 5 cm of molding | 94% | 81% |
| 203 of the impact points were at or within 6 cm of molding | 100% | 86% |
| 33 of the impact points were beyond 6 cm from the molding | | 100% |
| 236 | | |

The data from this survey summarized by impact location for 203 impacts within 6 cm are:

Top—45 total windshields chipped at the top, all had cracked 16 were chipped at 1 (0.39") centimeter from the molding. 9 were chipped at 1.5 centimeters from the molding. 5 were chipped at 2 centimeters from the molding. 1 was chipped at 2.5 centimeters from the molding. 6 were chipped at 3 centimeters from the molding. 3 were chipped at 3.5 centimeters from the molding. 3 were chipped at 4 centimeters from the molding. 2 were chipped at 5.5 centimeters from the molding. 45

Sides—66 total windshields chipped at the sides, all had cracked 28 were chipped at 1 centimeter from the molding. 7 were chipped at 1.5 centimeters from the molding. 12 were chipped at 2 centimeters from the molding. 4 were chipped at 2.5 centimeters from the molding. 7 were chipped at 3 centimeters from the molding. 1 was chipped at 4 centimeters from the molding. 1 was chipped at 4.5 centimeters from the molding. 1 was chipped at 5 centimeters from the molding. 2 were chipped at 5.5 centimeters from the molding. 3 were chipped at 6 centimeters from the molding. 66

Bottom—96 total windshields chipped at bottom, and had cracked 30 were chipped at 1 centimeter from the molding. 14 were chipped at 1.5 centimeters from the molding. 16 were chipped at 2 centimeters from the molding. 5 were chipped at 2.5 centimeters from the molding. 3 were chipped at 3 centimeters from the molding. 3 were chipped at 3.5 centimeters from the molding. 11 were chipped at 4 centimeters from the molding. 3 were chipped at 4.5 centimeters from the molding. 2 were chipped at 5 centimeters from the molding. 1 was chipped at 5.5 centimeters from the molding. 4 were chipped at 6 centimeters from the molding. 92

A number of chips which had not cracked were seen beyond 6 cm from the edge these are considered windshields that are not destroyed, as chips past 6 cm rarely crack. Also, 23 additional chips were observed within 6 cm of the molding, which had not cracked. Although these were not counted as cracks it is known that any chip from 6 cm or less will nearly always eventually produce an edge crack while chips beyond 6 cm rarely produce an edge crack.

The rules adapted by the Ultra Bond Corporation for its repair methods, establish that most cracks over 18" long should not be repaired because of dirt accumulation in such cracks. Thirty two of the 236 edge cracks were 18" or under. Under this rule, 32 of the 236 cracks were deemed repairable. The balance, 204, would not be considered repairable. However most cracked windshields are replaced anyway.

The data conclusion is that a 6 cm wide impact resistant film would have prevented 86% of the edge cracks.

EXAMPLE III

These data were observed over a period of time at a windshield replacement and repair shop in Colorado Springs, Colo. A total of 80 windshields were surveyed which had long cracks. Many chips (the impact point) were observed in the "frit" at the edge of the windshield. This is the black border near the edge of some windshields.

TABLE 1

Cumulative Data

|  | Percent of Total at 6 cm or Less | Percent of Owned Total |
|---|---|---|
| 36 of the impact points were at or within 1 cm of molding | 52% | 45% |
| 54 of the impact points were at or within 2 cm of molding | 78% | 67% |
| 60 of the impact points were at or within 3 cm of molding | 87% | 75% |
| 65 of the impact points were at or within 4 cm of molding | 94% | 81% |
| 68 of the impact points were at or within 5 cm of molding | 99% | 85% |
| 69 of the impact points were at or within 6 cm of molding | 100% | 86% |
| 69 | | |
| 11 of the impact points were beyond 6 cm from the molding | | 100% |
| 80 | | |

Also in this survey distribution data for the 69 impacts were taken. These are: 16 were chipped at the top 1 at 0.5 cm 11 at 1 cm 3 at 2 cm 1 at 5 cm 22 were chipped on the sides 1 at 0.5 cm 10 at 1 cm 7 at 2 cm 1 at 2.5 cm 3 at 4 cm 31 were chipped on the bottom 1 at 0.5 cm 12 at 1 cm 2 at 1.5 cm 6 at 2 cm 5 at 3 cm 2 at 4 cm 1 at 4.5 cm 1 at 5 cm 1 at 6 cm

EXAMPLE IV

Forty-three windshields having edge cracks over six inches long were studied. Fourteen were cracked near the bottom. Of these, the chip location was noted as follows:

| Number of Observed | Distance of Impact From Bottom Molding | Percent of Total | Cumulative Total |
|---|---|---|---|
| 7 | 2.0 cm (0.79") | 50% | 50% |
| 3 | 1.0 cm (0.39") | 22% | 77% |
| 2 | 4.5 cm (1.77") | 14% | 86% |
| 2 | 12.0 cm (4.72") | 14% | 100% |
| 14 | | | |

The balance, 29, were elsewhere but close to the top and sides. That is, 32% of the cracks were from damage near the bottom versus the sides and top.

EXAMPLE V

A random survey of 200 repaired cracks from a windshield repair shop in Riverside, Calif. showed that 3 out of 200 long cracks were floaters (did not extend to the edge) and the balance, 197 were edge cracks.

Coupled with the data in Examples I–IV it is concluded that the overwhelming majority of long cracks are from impacts near the edge. Nearly all of these would result in windshield replacement, the edge crack is the cause of over 90% of windshield replacements. The present invention would nearly eliminate the need for windshield replacement or long crack repair.

So-called stone damage, that is damage that does not have a long crack frequently appears as a bullseye, star break or combination break. Sometimes stone damage results in later evolution of a long crack. However in the vulnerable peripheral areas, an impact is most frequently seen as a small surface chip, absent any bullseye or starring but with a crack running through the impact point to the edge of the glass. A chip, which defines the point of impact, when near the edge is usually just pin head size, but on some occasions it is a star or bullseye. In such cases, either instantly or very soon (minutes or at most a few hours) after impact a long crack appears running through the impact point to the edge of the glass (called an edge crack). Exceptions are extremely rare. Cracks from the top and bottom often proceed vertically for a short distance, then turn horizontally. Virtually all cracks formed from an impact in the vulnerable area extend to the glass edge. Cracks that extend to the glass edge open wider than cracks which don't extend to the glass edge and travel faster.

The peripheral area of the windshield defines a vulnerable area more specifically defined by the above data. It is believed that this vulnerability derives from the windshield being under greater stress and strain in the vulnerable area from being attached to the vehicle and the slight bow shape. Also, near the bottom there is increased strain from use of defrosters/heaters directed at the lower portion of the windshield.

For practical reasons it is considered that about 12 cm is the maximum guardable width of the periphery. This is due to concerns respecting interference by or damage to the barrier from windshield wiper operation and interference with visibility. Also wear and tear on wiper blades is a concern. This will vary among vehicle configurations. Also, it is appreciated that visibility concerns allow a wider film at the top and bottom. Also, in some vehicles the hood line is above the molding at the bottom of the windshield. That is, the windshield and the molding extend below the hood line.

A survey of windshield moldings disclosed the following data:

| Vehicle | Molding Width and Data |
| --- | --- |
| 1988 to 1995 Chevy Full Size P.U. | ⅜" Nags #1026-121 |
| 1986 to 1995 Ford Taurus | ⅜" Nags #1097 |
| 1990 to 1995 Ford Explorer | ⅜" Nags #1087 |
| 1985 to 1994 Subaru Loyale | ⅛" FCW #499 |
| 1982 to 1990 Chevy Celebrity | ¼" WIC #14 |
| 1993 to 1995 Jeep Grand Cherokee | ¼" WIC #14 |
| 1989 to 1995 Toyota P.U. | ⅜" Nags #598 |
| 1987 to 1995 Chrysler Leberon | ½" Nags #10 |
| 1993 to 1995 Chrysler Concord | ⅜" Nags #118 |

Another survey of windshield moldings disclosed the following data:

| Vehicle | Measurement of Molding |
| --- | --- |
| 1994 Ford Explorer | 2 cm |
| 1992 Mitsubishi Diamante | 1½ cm |
| 1982 Jeep Eagle | 2 cm |
| Geo Prizm | less than ½ cm |
| Saturn | 1½ cm |
| Toyota 4 Runner | 1½ cm |
| Dodge Dynasty | 1½ cm |
| Ford Bronco | 2 cm |
| Chevy Blazer | 1 cm |
| Buick Century | 1 cm |
| Dodge Caravan | 1 cm |
| Toyota Startlet | 2 cm |
| GMC Surburban | 2 cm |
| Ford Mustang | 2 cm |
| Chevy Corsica | 1½ cm |
| Toyota Celica | 1 cm |
| Jeep Grand Wagoneer | 1½ cm |
| Pontiac Grand Prix | 1 cm |
| Honda Civic | 1 cm |
| Subaru Wagon | 1 cm |
| Nissan Maxima | 1 cm |
| Ford Tempo | 1 cm |
| Audi 5000 | 1 cm |
| Buick Park Avenue | 1 cm |
| Honda Sedan | ½ cm |
| Honda Civic VX | ½ cm |
| Pontiac Transport | 1 cm |
| Cadillac | 2 cm |
| Honda Accord EX | 1 cm |
| 1994 Ford Taurus | 1 cm |

Therefore, if a barrier is to be provided by an extended molding, it should be preferably at least about 4 cm over the glass or preferably at least about 5 cm over the glass. The molding should preferably extend to a limit about the same distance as demonstrated by the foregoing examples.

It is appreciated that application of a shock absorbent film or other barrier on the bottom of the windshield will have to be different from that at the top and sides in many vehicles. This is because of the peculiar construction of some vehicles at and adjacent the bottom of the windshield. In some such cases the bottom of the windshield is under the level of the hood, and sometimes has as much as two inches of protection from the hood. The molding will be below the hood line. In such cases exposure of the windshield to damage begins at the level of the hood. That is, below the hood, it is not expected to see damage. Thus, the vulnerable area is defined as beginning from the hood line, where the windshield extends below the hood line. Also, some vehicles have a wider molding on the bottom and it may have a complex shape. Therefore it is useful to define an effective border for the bottom of the windshield which is either the molding inner edge or the hood line, whichever is higher. For the top and sides, the molding inner edge is the border. The 1986 Cadillac Sedan DeVille, for example, has a 6 cm. metal molding on the bottom and a 1 cm conventional molding on the top and sides. Also, when viewing the bottom of the windshield from the front, level with the hood, this 6 cm molding is not seen, that is, it does not cover any of the exposed glass, the entire 6 cm molding is beneath the level of the hood (note the 6 cm molding covers only about 2 cm of glass).

Moldings of such greater width apparently are only used on the bottom. Many vehicles have different molding on the bottom than on the top and sides. The impact protective barrier of this invention, can be wider on the bottom than at the top and sides because there is less potential interference with visibility, and in some cases it will extend below the hood. The bottom protective barrier will have to extend upward beyond the level of the hood. The top also allows greater width due to less potential interference with visibility.

Whether the protective barrier is incorporated into the OEM or replacement molding, the foregoing considerations should be appreciated. Many vehicles have a black "frit" which extends as much as 5" on some vehicles, commonly about 1"–2" from the molding. If the impact absorbent barrier is limited to the frit then visibility would not necessarily be interfered with and therefore clarity if of less concern. An opaque barrier would be more acceptable.

In a preferred embodiment the film is a clear polyester. It can be a single-ply of film. A further preference is that the polyester film be a laminated multi-ply, more preferably 2-ply. Such films have a preferred thickness range of 6–10 mils, more preferably 6–8 mils, the most preferred thickness being 7 or 8 mils. The range of 6–8 mils thick is preferred when used with bowed windshield surfaces. The term bowed refers to curvature in the planar surface or body of the windshield, this term being used to distinguish over the term curved as related to the peripheral lines described above, as shown in FIGS. 1 & 2. Sometimes bowing is a compound curvature, the windshield being bowed both horizontally and vertically. In the case of bowed surfaces, the film may be too stiff. Thus, it has been found that the thickness at 10 mils may be too stiff when applied to bowed surfaces while the 6–8 mil range is not too stiff. The most preferred thickness is 7 and 8 mils. These thickness designations refer to the nominal measurements provided by manufacturers of plastic film.

Polyester films exemplary of the above description and having been used successfully are made by MADICO, Inc., Woburn, Mass. as its product designations LCL-600XSR and LCL-800-XSR and a 7 mil film sold by that company.

Further, the preferred film width is 3 inches for the top and sides and 4 inches for the bottom; this dimension being derived from a broad range of applications and experience to reach the best average for all applications. Also, special issues at the bottom are appreciated, that more impacts and therefore more edge cracks are seen at the bottom than at either the sides or top. Stone breaks that become edge cracks are more frequent at the bottom. Also, the bottom can tolerate a greater width because visibility is not an issue until higher on the windshield. And, finally, even if the windshield is below the hood line, 4 inches works well because the stresses on the windshield decrease as the distance from the edge increases. This is significant because it is not the distance per se from the edge which causes an edge crack, but rather the increased stress nearer to the edge.

Although particular embodiments of the invention have been described and illustrated herein, it is recognized that modifications and variations may readily occur to those skilled in the art, and consequently it is intended that the claims be interpreted to cover such modifications and equivalents.

We claim:

1. A method of guarding a vehicle windshield against damage from impacts comprising;
    adhering around the periphery of the windshield a barrier of impact protective material of selected width comprising elements conforming to the shape of the windshield placed over portions of the windshield periphery selected from one or more of:
        a. the sides of the windshield;
        b. the top of the windshield;
        c. the bottom of the windshield;
    said barrier being a clear polyester film.

2. The method of claim 1 wherein said clear polyester film has a thickness in the range of 6–10 mils.

3. The method of claim 2 wherein said thickness is in the range of 6–8 mils.

4. The method of claim 3 wherein said thickness is in the range of 7–8 mils.

5. The method of claim 1 wherein said polyester film is a single ply film.

6. The method of claim 1 wherein said clear polyester film is a multi-layer laminate.

7. The method of claim 6 wherein said multi-layer laminate is a 2-layer laminate.

8. The method of claim 7 wherein said clear polyester film has a thickness in the range of 6–10 mils.

9. The method of claim 8 wherein said clear polyester film has a thickness in the range of 6–8 mils.

10. The method of claim 9 wherein said clear polyester film has a thickness in the range of 7–8 mils.

11. The method of claim 1 wherein said clear polyester film has on one side an acrylic pressure sensitive adhesive.

12. The method of claim 1 wherein said clear polyester film has a width of up to about 4 inches.

13. The method of claim 12 wherein said clear polyester film has a width of up to about 3 inches.

14. The method of claim 12 wherein said clear polyester film has a width on the top and sides of the windshield of up to about 3 inches and a width on the bottom of the windshield of up to about 4 inches.

15. A method of guarding a vehicle windshield against damage from impacts comprising;
    adhering around the periphery of the windshield a barrier of impact protective material of selected width comprising elements conforming to the shape of the windshield placed over portions of the windshield periphery selected from one or more of:
        a. the sides of the windshield;
        b. the top of the windshield;
        c. the bottom of the windshield;
    said barrier being a clear polymeric film and wherein said clear polymeric film has a thickness in the range of about 6–10 mils.

16. The method of claim 15 wherein said thickness is in the range of about 6–8 mils.

17. The method of claim 16 wherein said thickness is in the range of about 7–8 mils.

18. The method of claim 15 wherein said polymeric film is a single ply film.

19. The method of claim 15 wherein said clear polymeric film is a multi-layer laminate.

20. The method of claim 19 wherein said multi-layer laminate is a 2-layer laminate.

21. The method of claim 20 wherein said clear polymeric film has a thickness in the range of about 6–10 mils.

22. The method of claim 21 wherein said clear polymeric film has a thickness in the range of about 6–8 mils.

23. The method of claim 22 wherein said clear polymeric film has a thickness in the range of about 7–8 mils.

24. The method of claim 15 wherein said clear polymeric film has on one side an acrylic pressure sensitive adhesive.

25. The method of claim 15 wherein said clear polymeric film has a width of up to about 4 inches.

26. The method of claim 25 wherein said clear polymeric film has a width of up to about 3 inches.

27. The method of claim 25 wherein said clear polymeric film has a width on the top and sides of the windshield of up to about 3 inches and a width on the bottom of the windshield of up to about 4 inches.

* * * * *